United States Patent
Azuma et al.

(10) Patent No.: US 10,046,823 B2
(45) Date of Patent: Aug. 14, 2018

(54) STRADDLE-TYPE VEHICLE

(71) Applicant: Kawasaki Jukogyo Kabushiki Kaisha, Kobe-shi, Hyogo (JP)

(72) Inventors: Seiji Azuma, Kako-gun (JP); Atsuya Yoshida, Kakogawa (JP); Koji Nishida, Kakogawa (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 15/275,655

(22) Filed: Sep. 26, 2016

(65) Prior Publication Data

US 2017/0088210 A1   Mar. 30, 2017

(30) Foreign Application Priority Data

Sep. 28, 2015   (JP) .................................. 2015-190002

(51) Int. Cl.
| | |
|---|---|
| *B62J 99/00* | (2009.01) |
| *B62J 35/00* | (2006.01) |
| *B62M 7/02* | (2006.01) |
| *F02M 35/04* | (2006.01) |
| *F02M 35/16* | (2006.01) |

(52) U.S. Cl.
CPC ............ *B62J 99/00* (2013.01); *B62J 35/00* (2013.01); *B62M 7/02* (2013.01); *F02M 35/042* (2013.01); *F02M 35/048* (2013.01); *F02M 35/162* (2013.01); *B62J 2099/002* (2013.01); *B62K 2207/00* (2013.01)

(58) Field of Classification Search
CPC .................................................... F02M 15/162
See application file for complete search history.

(56) References Cited

U.S. PATENT DOCUMENTS 9,802,589 B2 * 10/2017 Kitagawa ............... G01D 11/30
2016/0348622 A1 * 12/2016 Hotta .................. F02M 37/0017

FOREIGN PATENT DOCUMENTS

| JP | 4489567 B2 | 6/2010 |
|---|---|---|
| JP | 2012171098 A | 9/2012 |
| JP | 5319357 B2 | 10/2013 |
| JP | 2014069696 A | 4/2014 |

OTHER PUBLICATIONS

European Patent Office, Extended European Search Report Issued in Application No. 16191141.7, Feb. 20, 2017, Germany, 9 pages.

* cited by examiner

*Primary Examiner* — Kevin Hurley
(74) *Attorney, Agent, or Firm* — Alleman Hall Creasman & Tuttle LLP

(57) ABSTRACT

A straddle-type vehicle comprises a front wheel and a rear wheel, an engine disposed between the front wheel and the rear wheel, an air cleaner box disposed above the engine, and a vehicle body behavior sensor provided on a periphery of the air cleaner box and located above a bottom wall surface of the air cleaner box.

13 Claims, 8 Drawing Sheets

STRADDLE-TYPE VEHICLE

CROSS-REFERENCE TO THE RELATED APPLICATION

This application claims priority to and the benefit of Japanese Patent Application No. 2015-190002 filed on Sep. 28, 2015, the entire disclosure of which is incorporated herein by reference.

BACKGROUND OF THE INVENTION

Field of the Invention

The present invention relates to a straddle-type vehicle. Particularly, the present invention relates to a straddle-type vehicle including a vehicle body behavior sensor.

Description of the Related Art

An exemplary straddle-type vehicle such as a motorcycle incorporates a vehicle body behavior sensor which detects the behavior (motion) of a vehicle body while the vehicle is traveling. In an exemplary configuration, a gyro sensor which is an example of the vehicle body behavior sensor is disposed in the vicinity of a head pipe of the vehicle body (see Japanese Patent Publication No. 5319357). In another exemplary configuration, a gyro sensor is disposed in a space which is formed below a seat straddled by a rider (see Japanese Patent Publication No. 4489567).

However, each of the above-described gyro sensors is disposed in a location that is distant from an engine. For this reason, if the center of gravity of the vehicle body is located in the vicinity of the engine, there causes a difference between a vehicle body behavior at the center of gravity of the vehicle body and a vehicle body behavior detected by the vehicle body behavior sensor. Or, if the vehicle body behavior sensor is disposed to be close to the engine, the vehicle body behavior sensor is required to have a heat resistance to heated air radiated from the engine, or to be thermally protected from the heated air radiated from the engine, for example.

In view of the above, an object of the present invention is to provide a sensor layout of a straddle-type vehicle, which allows a sensor to output a signal indicting a vehicle body behavior which is close to a vehicle body behavior at the center of gravity of a vehicle body, while thermally protecting the sensor.

SUMMARY OF THE INVENTION

According to an aspect of the present invention, a straddle-type vehicle comprises a front wheel and a rear wheel; an engine disposed between the front wheel and the rear wheel; an air cleaner box disposed above the engine; and a vehicle body behavior sensor provided on a periphery of the air cleaner box and located above a bottom wall surface of the air cleaner box.

In accordance with this configuration, since the bottom wall surface of the air cleaner box can suppress the heated air radiated from the engine from flowing in an upward direction toward the vehicle body behavior sensor, a temperature increase in the vehicle body behavior sensor can be prevented. Since the vehicle body behavior sensor is provided on the periphery of the air cleaner box and disposed in a location that is close to the center of gravity of the vehicle body, the vehicle body behavior sensor can output a signal indicating a vehicle body behavior which deviates less from the vehicle body behavior at the center of gravity. Therefore, it becomes possible to provide a sensor layout of the straddle-type vehicle, which allows the vehicle body behavior sensor to output a signal indicating a vehicle body behavior which is close to the vehicle body behavior at the center of gravity, while thermally protecting the vehicle body behavior sensor.

In the above-described straddle-type vehicle, at least a portion of the air cleaner box may be disposed on a straight line connecting the vehicle body behavior sensor and the engine to each other.

In accordance with this configuration, the air cleaner box can prevent the heated air radiated from the engine from reaching the vehicle body behavior sensor.

In the above-described straddle-type vehicle, the vehicle body behavior sensor may be attached and supported on the air cleaner box.

In accordance with this configuration, it becomes possible to prevent an amplitude attributed to the vibration of the engine from being transmitted to the vehicle body behavior sensor, and it becomes possible to obtain a signal indicating the vehicle body behavior which is close to the vehicle body behavior at the center of gravity of the vehicle body, compared to a case where the vehicle body behavior sensor is fastened to a vehicle body frame.

In the above-described straddle-type vehicle, the air cleaner box may include a reinforcement structure which suppresses a vibration in a thickness direction of a support surface on which the vehicle body behavior sensor is supported.

During an intake stroke of the engine, an air-intake pressure of the air is generated by the reciprocating motion of a piston and is transmitted to the air cleaner box. However, this air-intake pressure is blocked by closing an intake value of the engine, so that an air-intake pulsation occurs in the air flowing from the air cleaner box toward the engine. The air-intake pulsation occurring in the inner space of the air cleaner box may be transmitted to the vehicle body behavior sensor fastened to the air cleaner box. However, in accordance with the above-described configuration, because of the reinforcement structure provided at the air cleaner box, it becomes possible to prevent a vibration of the support surface of the air cleaner box which would be caused by the air-intake pulsation. Therefore, the effects of the air-intake pulsation on the vehicle body behavior sensor can be reduced.

In the above-described straddle-type vehicle, the air cleaner box may have on an outer wall surface thereof, a recess in which at least a portion of the vehicle body behavior sensor is accommodated.

In accordance with this configuration, in a case where the vehicle body behavior sensor is attached and supported on the air cleaner box, the vehicle body behavior sensor can be positioned while maintaining flexibility of a layout of other members. For example, in a case where the vehicle body behavior sensor is disposed between the fuel tank and the air cleaner box, interference between the fuel tank and the vehicle body behavior sensor can be prevented while securing the volume of the fuel tank. Or, in a case where the air cleaner box is disposed to face in the vehicle width direction a cover member covering a space formed between the fuel tank the vehicle body frame when viewed from a side, and the vehicle body behavior sensor is disposed between the cover member and the air cleaner box, interference between the cover member and the vehicle body behavior sensor can be prevented while preventing the cover member from protruding outward in the vehicle width direction.

The above-described straddle-type vehicle may further comprise a fuel tank disposed above the air cleaner box, and the vehicle body behavior sensor may be disposed between the fuel tank and the air cleaner box.

In accordance with this configuration, a third party cannot easily access the vehicle body behavior sensor. This makes it possible to prevent the third party from detaching the vehicle body behavior sensor from the air cleaner box.

In the above-described straddle-type vehicle, the vehicle body behavior sensor may be disposed on a side wall surface of the air cleaner box.

In accordance with this configuration, interference between the vehicle body behavior sensor and other members in the vertical direction can be prevented.

In the above-described straddle-type vehicle, at least a part of the vehicle body behavior sensor may conform to an air-intake connection passage connecting the air cleaner box and the engine to each other, in a position in a forward and rearward direction.

In accordance with this configuration, the vehicle body behavior sensor can be disposed in a location that is in the vicinity of a throttle body of the engine and is the center of gravity of the vehicle body. Therefore, it becomes possible to obtain a signal indicating the vehicle body behavior which is close to the vehicle body behavior at the center of gravity.

According to another aspect of the present invention, a straddle-type vehicle comprises a front wheel and a rear wheel; an engine disposed between the front wheel and the rear wheel; a vehicle component disposed above the engine; and a vehicle body behavior sensor disposed above a bottom wall surface of the vehicle component.

In accordance with this configuration, since the bottom wall surface of the vehicle component can suppress the heated air radiated from the engine from flowing in an upward direction toward the vehicle body behavior sensor, a temperature increase in the vehicle body behavior sensor can be prevented. Since the vehicle body behavior sensor is disposed in a location that is in the vicinity of the engine and is close to the center of gravity of the vehicle body, it becomes possible to obtain a signal indicating the vehicle body behavior which is close to the vehicle body behavior at the center of gravity.

The above and further objects, features and advantages of the present invention will more fully be apparent from the following detailed description of preferred embodiment with accompanying drawings.

DETAILED DESCRIPTION OF THE EMBODIMENTS

Hereinafter, the embodiments of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction of the vehicle body of the motorcycle corresponds with a rightward and leftward direction.

Embodiment 1

Figure 1:
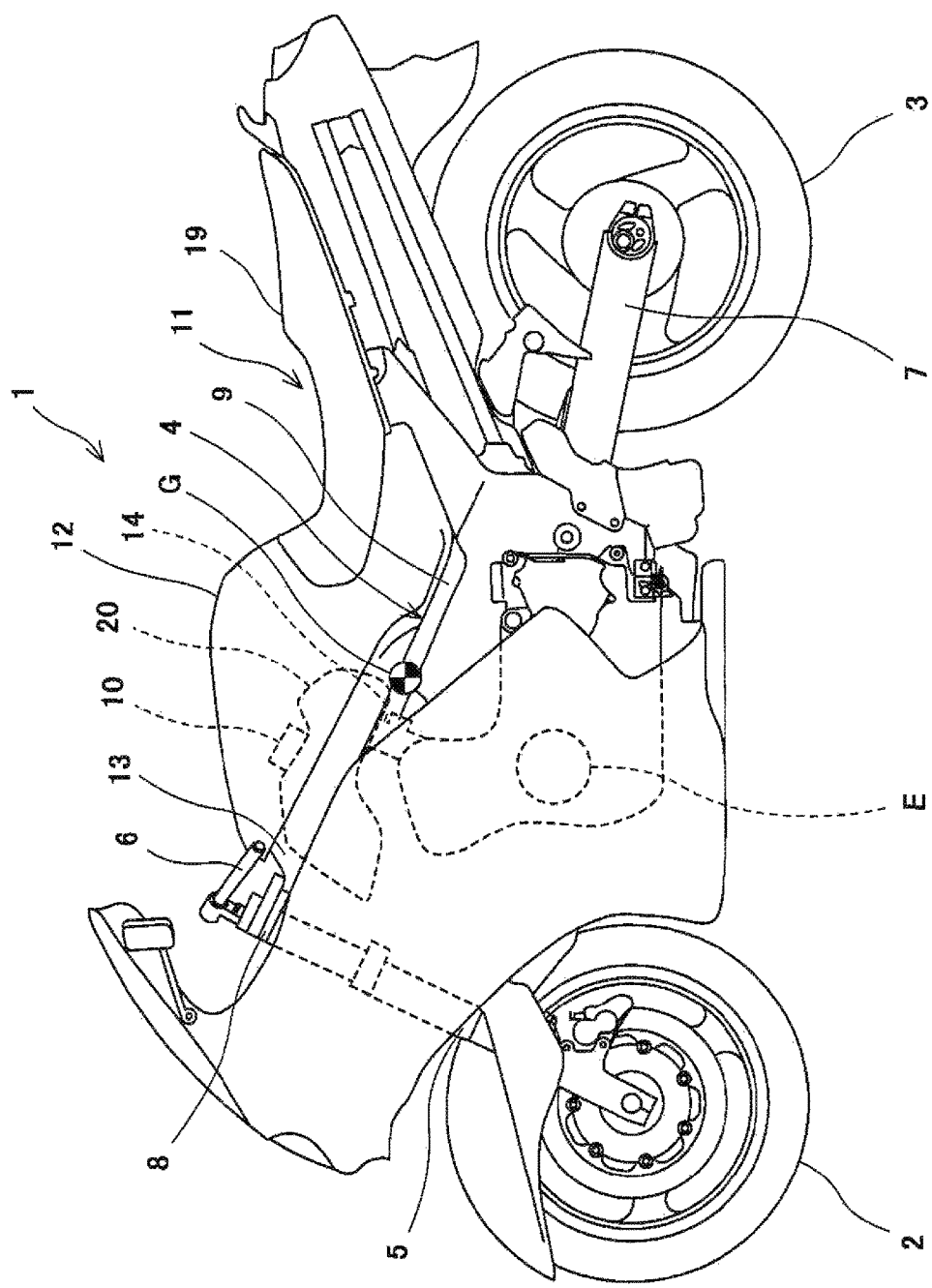
FIG. 1 is a left side view of a motorcycle which is an example of a straddle-type vehicle according to Embodiment 1.

FIG. 1 is a left side view of a motorcycle 1 according to Embodiment 1. As shown in FIG. 1, the motorcycle 1 includes a front wheel 2, a rear wheel 3, and a vehicle body frame 4 placed between the front wheel 2 and the rear wheel 3. The front wheel 2 is rotatably mounted to the lower end portion of a front fork 5 extending substantially vertically. A handle 6 extending in the rightward and leftward direction is rotatably attached to the upper end portion of the front fork 5 via a steering shaft (not shown). The rear wheel 3 is rotatably mounted to the vehicle body frame 4 via a swing arm 7. The vehicle body frame 4 includes a head pipe 8, a front frame 9 extending rearward from the head pipe 8, and a rear frame (not shown) extending rearward from the rear end of the front frame 9.

An engine E is disposed in a location that is below the front frame 9 and between the front wheel 2 and the rear wheel 3. In the present embodiment, the engine E is a four-cycle in-line four-cylinder engine. The engine E includes four cylinders arranged in the rightward and leftward direction (in the vehicle width direction). The engine E is disposed to overlap with a vehicle body center line L0 of a vehicle body 11, extending in a forward and rearward direction, when viewed from above. An air cleaner box (vehicle component) 20 is disposed above the engine E. The air cleaner box 20 is connected to the engine E via a throttle body 14.

In the motorcycle 1 of the present embodiment, a center of gravity G of the vehicle body 11 is set in front of a seat 19, between the front wheel 2 and the rear wheel 3. In a case where the engine E is disposed between the front wheel 2 and the rear wheel 3 and in front of the swing arm 7, for example, the center of gravity G is set in a location that is close to the rear portion of the cylinder of the engine E. In the present embodiment, the center of gravity G is set in a location that is in the vicinity of the throttle body 14, to be precise, a location that is slightly rearward to the throttle body 14.

An air duct (not shown) for guiding air from an outside region is connected to the air cleaner box 20. The air flows into the air cleaner box 20 through the air duct and is filtered by an air cleaner element 41 of the air cleaner box 20. The resulting clean air is supplied to the engine E. The air flowing through the inner space of the air cleaner box 20 forms an air layer A and then is supplied to the engine E. The air cleaner box 20 is a functional vehicle component having a function of cleaning the air to be supplied to the engine E in the motorcycle 1.

A fuel tank 12 is disposed above the air cleaner box 20. A cover member 13 is disposed between the fuel tank 12 and the front frame 9 in a vertical direction. The cover member 13 covers a space formed between the fuel tank 12 and the front frame 9. The rear portion of the air cleaner box 20 is located on a straight line connecting the engine E and the fuel tank 12 to each other. A vehicle body behavior sensor (vehicle body motion sensor) 10 is attached and supported on the outer wall surface of the air cleaner box 20. In the present embodiment, the vehicle body behavior sensor 10 is attached to an upper wall surface S1 of the outer wall surface of the air cleaner box 20. Thus, the upper wall surface S1 of the air cleaner box 20 is a support surface on which vehicle body behavior sensor 10 is supported.

The vehicle body behavior sensor 10 is a sensor for detecting the behavior of the vehicle body 11 (motion of the vehicle body 11) of the motorcycle 1. The vehicle body behavior sensor 10 may detect a physical motion at a sensor mounting section or an external force applied to the sensor mounting section. Examples of the physical motion include a change over time (speed, acceleration rate) in a position in any one of axial directions of an axis extending in the forward and rearward direction, an axis extending in the vertical direction (vertical axis), and an axis extending in the rightward and leftward direction, or a change over time (angular velocity, angular acceleration rate) in a position around one of the axis extending in the forward and rearward direction, the axis extending in the vertical direction (vertical axis), and the axis extending in the rightward and leftward direction. The vehicle body behavior sensor 10 may detect at least one of these changes over time as the physical motion. Further, the vehicle body behavior sensor 10 may detect as the external force a force including any one of a gravitational force component, an inertia force component, and a centrifugal force component. Moreover, the vehicle body behavior sensor 10 may detect the position of the vehicle body 11 or the posture of the vehicle body 11, as well as the change over time in the position of the vehicle body 11 or the change over time in the posture of the vehicle body 11.

In the present embodiment, the vehicle body behavior sensor 10 is a gyro sensor 10 which is an exemplary angular velocity sensor. The gyro sensor 10 is used to detect the posture of the vehicle body 11 during traveling of the motorcycle 1. As will be described in detail later, the gyro sensor 10 of the present embodiment is configured to detect an angular velocity around the axis (roll axis) of the vehicle body 11 extending in the forward and rearward direction, and an angular velocity around the axis (yawing (yaw) axis) of the vehicle body 11 extending in the vertical direction. Based on a detection signal output from the gyro sensor 10, a calculation unit calculates the inclination angle (vehicle body posture) of the axis set in the vehicle body 11. The motorcycle 1 includes an anti-lock brake system (ABS) which automatically increases or decreases a hydraulic pressure of a brake based on a vehicle state. The gyro sensor 10 is electrically connected to an ABS controller 15 (see FIG. 4) which controls the ABS via a sensor harness 16. For example, when the ABS controller 15 determines that the motorcycle 1 is turning based on the vehicle body posture detected by the gyro sensor 10, it sets a proper hydraulic pressure of the brake with respect to a wheel, to prevent the wheel from locking up (ceasing a motion), while the motorcycle 1 is turning.

Figure 3:
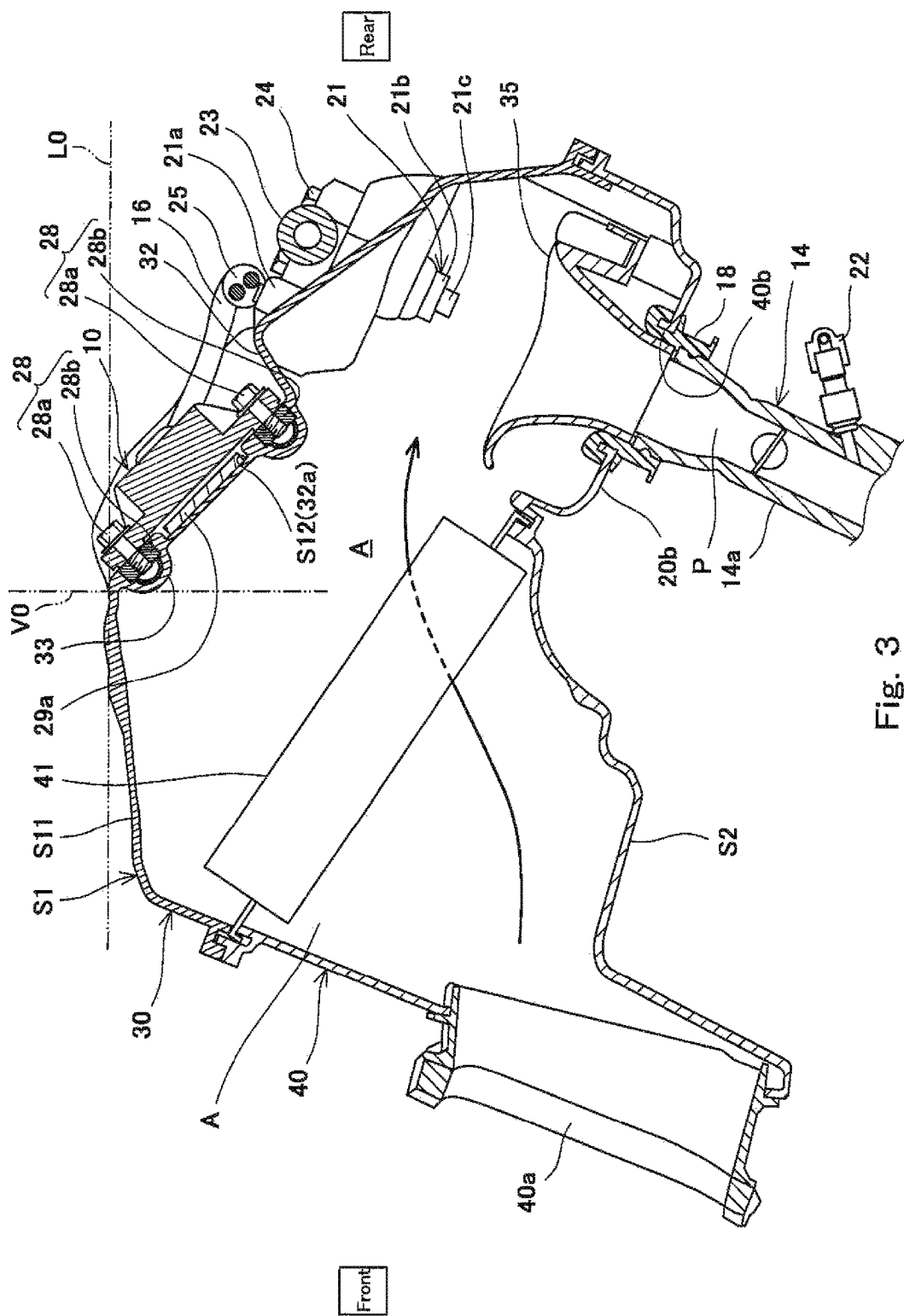
FIG. 3 is a cross-sectional view showing the air cleaner box of FIG. 1 and the region that is in the vicinity of the air cleaner box, which is taken along a plane extending through the vehicle body behavior sensor, when viewed from a side.
Figure 4:
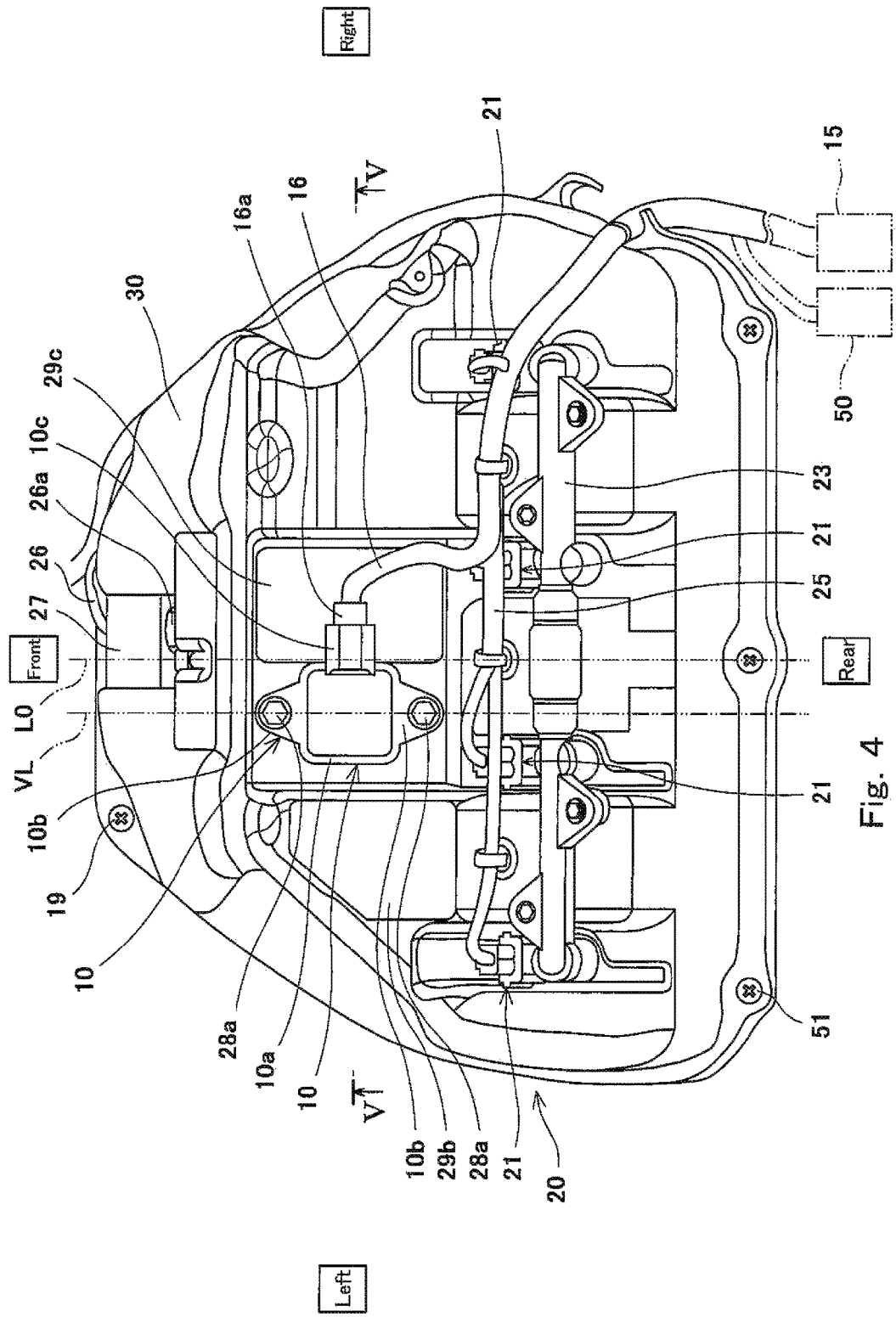
FIG. 4 is a plan view of the air cleaner box of FIG. 1.

The gyro sensor 10 is also connected to an engine ECU 50 (see FIG. 4). The engine ECU 50 is configured to control the ignition timing of the engine E, the fuel injection amounts of upstream and downstream injectors 21, 22 (see FIG. 3), etc., based on the vehicle body posture detected by the gyro sensor 10, to control an engine output which is suitable for traveling state of the motorcycle 1.

Figure 2:
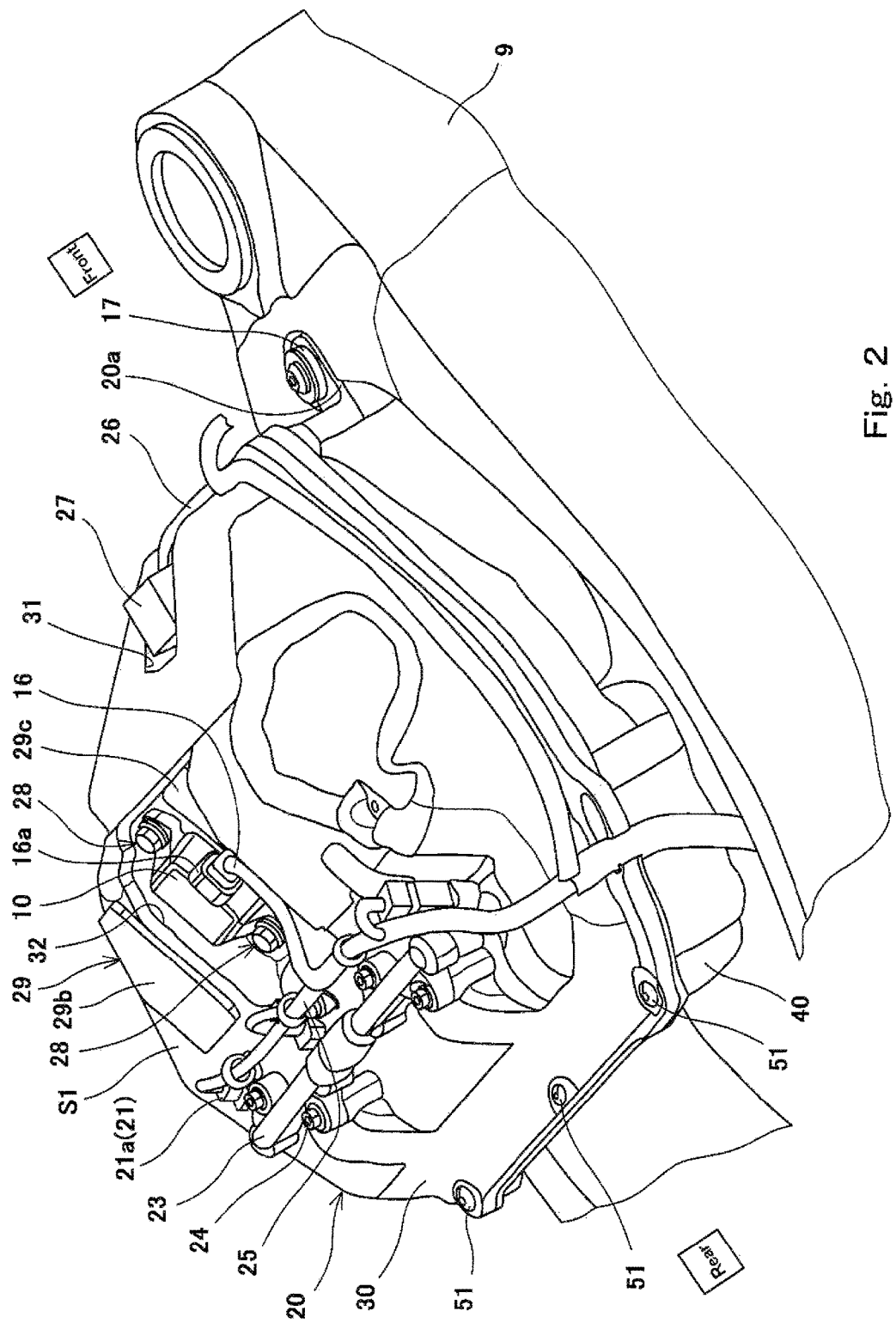
FIG. 2 is an enlarged perspective view showing a region that is in the vicinity of an air cleaner box of FIG. 1.
Figure 5:
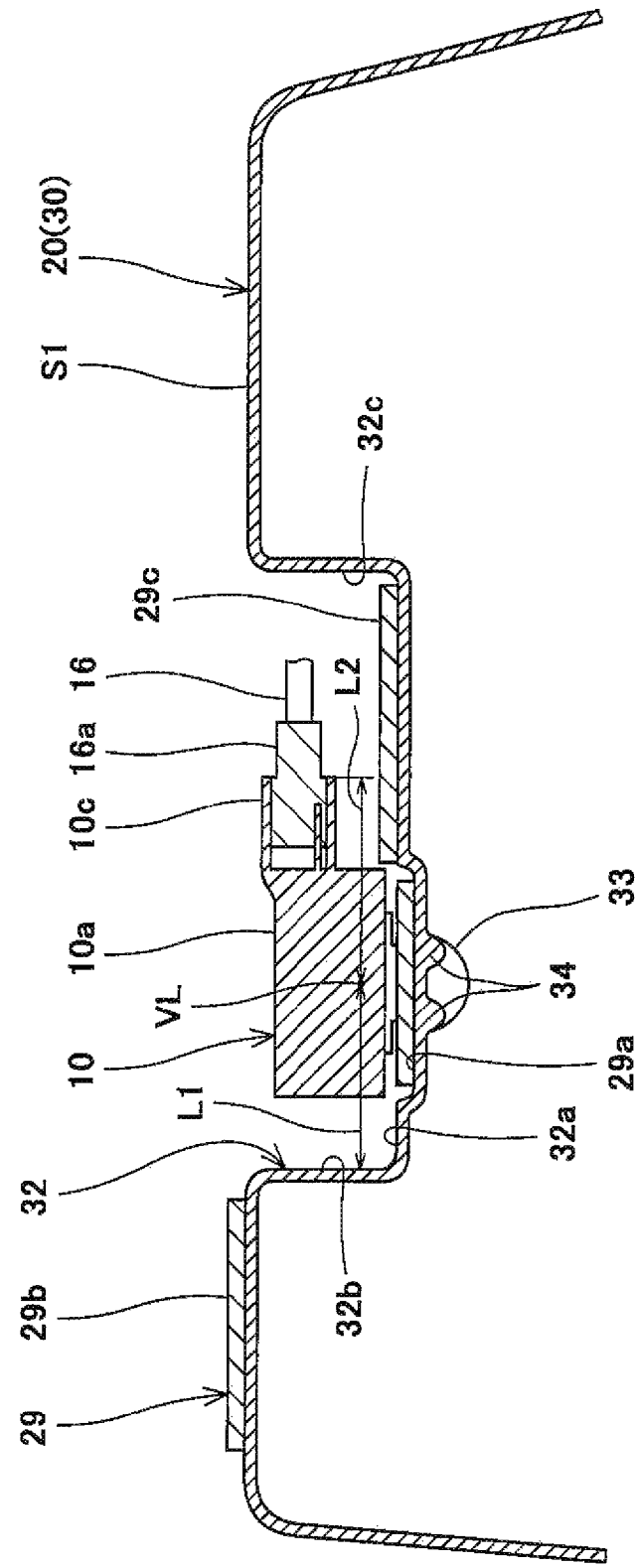
FIG. 5 is a cross-sectional view taken along line V-V of FIG. 4.

FIG. 2 is an enlarged perspective view showing a region that is in the vicinity of the air cleaner box 20 of FIG. 1. FIG. 3 is a cross-sectional view showing the air cleaner box 20 of FIG. 1 and the region that is in the vicinity of the air cleaner box 20, which is taken along a plane extending through the gyro sensor 10, when viewed from a side. FIG. 4 is a plan view of the air cleaner box 20 of FIG. 1. FIG. 5 is a cross-sectional view taken along line V-V of FIG. 4. Hereinafter, the shape and configuration of the air cleaner box 20, and a structure by which the gyro sensor 10 is fastened to the air cleaner box 20 will be described specifically with reference to FIGS. 2 to 5.

As shown in FIGS. 2 and 3, the air cleaner box 20 includes an upper case 30 and a lower case 40 which are fastened to each other by a plurality of fastener members 51. Each of the upper case 30 and the lower case 40 is formed of a resin material. The front end portion 20a of the air cleaner box 20 (the lower case 40) is supported on the front frame 9 of the vehicle body frame 4 via a first elastic member (e.g., rubber bush) 17. In contrast, the rear end portion 20b of the air cleaner box 20 is supported on the throttle body 14 via a second elastic member (e.g., rubber bush) 18. In this way, the air cleaner box 20 is supported on a vehicle body frame 4 and the throttle body 14 via rubber mounts, respectively.

An air-intake opening 40a is provided in the front portion of the lower case 40 of the air cleaner box 20 and faces forward. An exhaust opening 40b is provided in the rear portion of the lower case 40 of the air cleaner box 20 and is in communication with the throttle body 14. A fuel supply pipe 23 is fastened to the rear portion of the upper wall surface S1 of the air cleaner box 20 by use of a plurality of fastener members (e.g., bolts and nuts). The fuel supply pipe 23 extends in the vehicle width direction (rightward and leftward direction). The fuel supply pipe 23 is connected to the fuel tank 12 via a pipe (not shown) and supplies fuel to the upstream injectors 21. The upstream injectors 21 are provided to correspond to the four cylinders, respectively. As shown in FIG. 4, in the present embodiment, the four upstream injectors 21 are arranged in the vehicle width direction.

Each of the upstream injectors 21 includes an injector connector 21a and a fuel injection section 21b. The injector connector 21a is connected to the engine ECU 50 via an injector harness 25. The fuel injection section 21b penetrates the upper wall surface S1 of the air cleaner box 20 and is located in the inner space of the air cleaner box 20. The fuel injection section 21b is provided with an injection port 21c at a tip end thereof. Each of the upstream injectors 21 is controlled by the engine ECU 50 to inject the fuel into the inner space of the air cleaner box 20. Thus, in the inner space of the air cleaner box 20, the cleaned air and the fuel injected from the upstream injector 21 are mixed, and an air-fuel mixture is generated. The air-fuel mixture flows to the throttle body 14 through a guide member 35.

The throttle body 14 includes a passage section 14a formed with an inner passage which is in communication with a combustion chamber of the engine E. Since the air cleaner box 20 is connected to the engine E via the throttle body 14 in this way, an air-intake connection passage P connecting the air cleaner box 20 to the combustion chamber of the engine E is formed. The air-intake connection passage P is defined as an inner passage formed in the passage section 14a of the throttle body 14. The downstream injector 22 is attached to the passage section 14a of the throttle body 14. The downstream injector 22 injects the fuel supplied from the fuel supply pipe 23 into the inner passage of the passage section 14a. As described above, a fuel supply method of the motorcycle 1 is a double injector method which uses the upstream injectors 21 and the downstream injector 22.

The front wall surface of the front portion of the upper case 30 is recessed in a rearward direction to form a groove 31. An air-intake temperature sensor (not shown) is attached to the groove 31 of the upper case 30. The air-intake temperature sensor measures the temperature of the air to be supplied to the engine E, and outputs a signal indicating a measurement value to the engine ECU 50 via a cable 26 connected to the air-intake temperature sensor. A connector 26a (see FIG. 4) is provided at the tip end of the cable 26 and connected to the air-intake temperature sensor. A sponge material 27 is inserted into the groove 31 of the upper case 30 and covers the connector 26a to absorb a vibration of the connector 26a.

In a region of the upper case 30 which is rearward relative to the groove 31, a part of the upper wall surface S1 facing the fuel tank 12 in the vertical direction is recessed in a downward direction to form a recess 32. The gyro sensor 10 is entirely accommodated in the recess 32. Thus, the gyro sensor 10 is provided on the periphery of the air cleaner box 20 and is located above a bottom wall surface S2 of the air cleaner box 20. More specifically, the gyro sensor 10 is fastened to an inner surface (bottom surface) 32a of the recess 32 by use of a plurality of fastener members 28. In brief, the gyro sensor 10 is fastened to a functional vehicle component (the air cleaner box 20) which is much larger than the gyro sensor 10. Since the gyro sensor 10 is accommodated in the recess 32, the gyro sensor 10 is located between the front end portion 20a of the air cleaner box 20 and the rear end portion 20b of the air cleaner box 20.

Since the fuel tank 12 is provided above the air cleaner box 20, the gyro sensor 10 is located between the fuel tank 12 and the air cleaner box 20. Since the size of the fuel tank 12 is much larger than that of the gyro sensor 10, the gyro sensor 10 is hidden by the fuel tank 12 when viewed from above.

As shown in FIG. 3, the upper wall surface S1 of the air cleaner box 20 has a first inclined surface portion S11 and a second inclined surface portion S12 which are inclined with respect to the vehicle body center line L0 extending in the forward and rearward direction and a vertical line V0 extending in the vertical direction. The first inclined surface portion S11 of the upper wall surface S1 is slightly inclined in an upward direction, from its front end toward its rear end. In contrast, the second inclined surface portion S12 of the upper wall surface S1 is inclined in a downward direction, from its front end toward its rear end. The recess 32 is formed in the second inclined surface portion S12. The gyro sensor 10 is fastened to a fastening surface 32a of the recess 32. In this layout, the gyro sensor 10 can detect the angular velocity around the axis (roll axis) of the vehicle body 11 extending in the forward and rearward direction, and the angular velocity around the axis (yawing axis) of the vehicle body 11 extending in the vertical direction.

The gyro sensor 10 is fastened to the fastening surface 32a of the recess 32 to extend in the forward and rearward direction, by use of bolts 28a and nuts 28b. Each of the nuts 28b is retained in a nut retaining section 33 formed in the fastening surface 32a. In the present embodiment, a cap nut is used as the nut 28b. The nut 28b is firmly retained in the nut retaining section 33 by insert molding in resin molding of the upper case 30. The gyro sensor 10 is disposed in such a manner that the rear portion of the gyro sensor 10 conforms to the air-intake connection passage P in a position in the forward and rearward direction. In other words, the gyro sensor 10 is disposed in the vicinity of the throttle body 14 in the forward and rearward direction.

As shown in FIGS. 4 and 5, the gyro sensor 10 includes a body section 10a, a flange section 10b, and a connector connection section 10c. The body section 10a has a substantially rectangular parallelepiped shape. Inside the body section 10a, a circuit board in which an oscillator (vibrator), an IC, etc. are mounted is accommodated. The flange section 10b protrudes from the both sides of the body section 10a in the forward and rearward direction, and has insertion holes into which the bolts 28a are inserted, respectively. The connector connection section 10c protrudes to a first side (in the present embodiment, right side) in the vehicle width direction from the upper portion of the body section 10a and is connected to a connector 16a of the sensor harness 16.

The recess 32 in which the gyro sensor 10 is accommodated includes the fastening surface 32a and protruding surfaces 32b, 32c protruding upward from the both ends of the fastening surface 32a in the vehicle width direction (in the rightward and leftward direction). A distance L1 between a virtual line VL connecting the center axes of the two bolts 28a to each other when viewed from above, and the protruding surface 32b on a second side (in the present embodiment, left side) in the vehicle width direction is shorter than a distance L2 between the virtual line VL and the tip end surface of the connector connection section 10c. The virtual line VL extends in the forward and rearward direction and slightly deviates to a left from the vehicle body center line L0 extending in the forward and rearward direction. In brief, the gyro sensor 10 is fastened to the air cleaner box 20 in a location that is in the vicinity of the center of the vehicle body 11 in the vehicle width direction.

During an intake stroke of the engine E, an air-intake pressure of the air is generated by the reciprocating motion of a piston, and is transmitted to the air cleaner box 20. However, this air-intake pressure is blocked by closing an intake value of the engine E, so that an air-intake pulsation occurs in the air flowing from the air cleaner box 20 toward the engine E. By the air-intake pulsation, the outer wall surface of the air cleaner box 20 vibrates in a thickness direction thereof.

As shown in FIGS. 2 to 5, the air cleaner box 20 includes a reinforcement structure 29 which is capable of suppressing the vibration in the thickness direction of the upper wall surface (support surface) S1 on which the gyro sensor 10 is supported. In the present embodiment, the reinforcement structure 29 includes a plurality of plate members which are a first plate member 29a, a second plate member 29b, and a third plate member 29c. The first plate member 29a is provided on a region of the upper wall surface S1 of the air cleaner box 20, the region facing the gyro sensor 10. More specifically, the first plate member 29a is provided between the bottom wall surface of the body section 10a of the gyro sensor 10 and the fastening surface 32a of the recess 32. A plurality of ribs 34 are provided in a region of the inner wall surface of the air cleaner box 20, the region facing in the vehicle width direction the fastening surface 32a to which the first plate member 29a is fastened.

The second plate member 29b and the third plate member 29c are fastened to regions, respectively, which are in the vicinity of the gyro sensor 10. Specifically, the second plate member 29b is fastened to a region of the upper wall surface S1 of the air cleaner box 20 which is leftward relative to the recess 32. The third plate member 29c is fastened to a region of the fastening surface 32*a* which is rightward relative to the body section 10*a* of the gyro sensor 10.

The motorcycle 1 which is an example of the straddle-type vehicle and configured as described above can obtain the following advantages.

The gyro sensor 10 is provided on the periphery of the air cleaner box 20 and is disposed in a location that is above the bottom wall surface S2 of the air cleaner box 20, close to the center of gravity and is in the vicinity of the engine E. More specifically, the gyro sensor 10 is fastened to the upper wall surface S1 of the air cleaner box 20 in a location that is inward relative to the contour of the air cleaner box 20 when viewed from above. In this layout, the bottom wall surface S2 of the air cleaner box 20 can suppress the heated air radiated from the engine E from flowing in an upward direction toward the gyro sensor 10. This layout allows the gyro sensor 10 to output a signal indicating the vehicle body behavior which deviates less from the vehicle body behavior at the center of gravity while preventing a temperature increase in the gyro sensor 10. Thus, in the motorcycle 1, it becomes possible to provide a sensor layout of the motorcycle 1 which allows the vehicle body behavior sensor 10 to output the signal indicating the vehicle body behavior which is close to the vehicle body behavior at the center of gravity G while thermally protecting the gyro sensor 10.

Since the gyro sensor 10 is fastened to the air cleaner box 20 which is an example of the vehicle component mounted to the vehicle body 11, a sub-unit in which the gyro sensor 10 is fastened to the air cleaner box 20 can be mounted to the vehicle body 11 in the assembling operation of the motorcycle 1. Thus, the assembling operation can be easily carried out.

Since the rear portion of the air cleaner box 20 is located on a straight line connecting the gyro sensor 10 and the engine E to each other, the air cleaner box 20 can prevent the heated air radiated from the engine E from reaching the gyro sensor 10.

The air cleaner box 20 which is the vehicle component (functional vehicle component) has a function of cleaning the air to be supplied to the engine E for the motorcycle 1 to travel, as well as a function of preventing the heated air radiated from the engine E from reaching the gyro sensor 10. This makes it possible to reduce the number of members, compared to a case where a member used exclusively for preventing the heated air from reaching the gyro sensor 10 is additionally provided.

A fastening region (in the present embodiment, the recess 32 of the upper case 30 of the air cleaner box 20) to which the gyro sensor 10 is fastened is formed concurrently with a molding process of the upper case 30 made of a resin material. This makes it possible to reduce the number of members and the number of assembly steps, compared to a case where the gyro sensor 10 is fastened to the air cleaner box 20 by use of a bracket separate from the air cleaner box 20.

In a case where the gyro sensor 10 is fastened to the air cleaner box 20 (vehicle component), it becomes possible to prevent a situation in which a vibration of the engine E or a vibration of the vehicle body frame 4 generated while the motorcycle 1 is traveling on an uneven road surface is transmitted to the gyro sensor 10, because the fastening region of the air cleaner box 20 to which the gyro sensor 10 is fastened is made of the resin material.

The heated air radiated from the engine E is transferred to the bottom wall surface S2 of the air cleaner box 20 and then flows to the support surface (upper wall surface) S1 of the air cleaner box 20 on which the gyro sensor 10 is attached and supported. In the interior of the air cleaner box 20, the air layer A is present between the bottom wall surface S2 and the support surface S1. Because of the presence of the air layer A, it becomes possible to prevent the heated air transferred from the engine E to the bottom wall surface S2 of the air cleaner box 20 from being directly transferred to the support surface S1 of the air cleaner box 20. In addition, because of the presence of the air layer A, the heated air is cooled by the air to be supplied to the engine E, in the space formed between the bottom wall surface S2 and the support surface S1. This makes it possible to effectively prevent the heated air transferred from the engine E to the bottom wall surface S2 of the air cleaner box 20 from being transferred to the support surface S1. Also, a temperature increase in the gyro sensor 10 can be prevented while the gyro sensor 10 is disposed in a location that is close to the engine E.

To enable a single gyro sensor to detect the angular velocities around a plurality of axes, it is necessary to incline the fastening surface to which this gyro sensor is fastened, with respect to a horizontal plane. In the present embodiment, the gyro sensor 10 is fastened to the recess 32 formed in the second inclined surface portion S12 of the upper wall surface S1 of the air cleaner box 20. Since the upper wall surface S1 of the air cleaner box 20 is inclined with respect to the horizontal plane so that the air smoothly flows to the exhaust opening 40*b* which is in communication with the throttle body 14, the inclined fastening surface can be easily formed. As a result, the layout of the gyro sensor 10 can be designed easily.

Since the air-intake passage is made minimum with respect to the engine E overlapping with the vehicle body center line L0 when viewed from above, the air cleaner box 20 can be easily disposed at the center of the vehicle body 11 in the vehicle width direction. For this reason, the gyro sensor 10 fastened to the air cleaner box 20 can be easily disposed at the center of the vehicle body 11 in the vehicle width direction, and the mounting location of the gyro sensor 10 can be made close to the center of gravity G of the vehicle body 11 in the vehicle width direction. As a result, an output signal indicating the vehicle body behavior which is close to the vehicle body behavior at the center of gravity G can be obtained.

Since the gyro sensor 10 is attached and supported on the upper wall surface S1 of the air cleaner box 20, it becomes possible to prevent an amplitude attributed to the vibration of the engine E from being transmitted to the gyro sensor 10, compared to a case where the gyro sensor 10 is fastened to the vehicle body frame 4. Thus, the gyro sensor 10 can output a signal with a higher accuracy.

Since the gyro sensor 10 is accommodated in the recess 32 formed in the upper wall surface S1 of the air cleaner box 20, the gyro sensor 10 can be disposed while maintaining a flexibility of the layout of other members (in the present embodiment, the fuel tank 12) in a case where the gyro sensor 10 is attached and supported on the air cleaner box 20.

Specifically, in a case where the gyro sensor 10 is disposed between the fuel tank 12 and the air cleaner box 20, and the fuel tank 12 is required to have a larger size, it is generally difficult to design the layout of the fuel tank 12 in a small mounting space of the straddle-type vehicle. In the present embodiment, since the gyro sensor 10 is accommodated in the recess 32 formed by recessing the upper wall surface S1 of the air cleaner box 20 in a downward direction, interference between the fuel tank 12 and the gyro sensor 10 can be prevented while securing the volume of the fuel tank 12.

Since the gyro sensor 10 is disposed between the fuel tank 12 and the air cleaner box 20, a third party cannot easily access the gyro sensor 10. This makes it possible to prevent the third party from detaching the gyro sensor 10. Further, when the vehicle body 11 is viewed from above, the gyro sensor 10 is hidden by the fuel tank 12. Therefore, it becomes possible to prevent a situation in which the gyro sensor 10 is degraded due to the exposure of an ultraviolet ray, or a situation in which muddy water splashes onto the gyro sensor 10 while the motorcycle 1 is traveling.

In a case where a rapid change in the vehicle body behavior (motion) occurs in the configuration in which the front end portion 20a of the air cleaner box 20 is fastened to the vehicle body frame 4 via the elastic member 17 and the rear end portion 20b of the air cleaner box 20 is fastened to the throttle body 14 via the elastic member 18, this rapid change in the vehicle body behavior is mitigated by the elastic members 17, 18. For this reason, if the gyro sensor 10 is fastened to the front end portion or rear end portion of the air cleaner box 20, the mitigated change in the vehicle body behavior may be input to the gyro sensor 10. As a result, the gyro sensor 10 does not output a correct signal corresponding to the change in the vehicle body behavior of the vehicle body 11. Therefore, the signal output from the gyro sensor 10 is not accurate. To avoid this, in the present embodiment, the gyro sensor 10 is fastened to a region of the air cleaner box 20 which is located between the front end portion 20a and the rear end portion 20b of the air cleaner box 20. Therefore, the gyro sensor 10 is less affected by the mitigation of the change in the vehicle body behavior due to the fastening structure including the elastic members 17, 18. As a result, the accuracy of the signal output from the gyro sensor 10 does not become low.

The air cleaner box 20 includes the reinforcement structure 29 (the first plate member 29a, the second plate member 29b, and the third plate member 29c) capable of suppressing the vibration in the thickness direction of the upper wall surface (support surface) S1 on which the gyro sensor 10 is supported. Since the air cleaner box 20 is provided with the first to third plate members 29a to 29c, the vibration of the air cleaner box 20 due to the air-intake pulsation can be prevented, and the effects of the air-intake pulsation on the gyro sensor 10 can be reduced.

The plurality of ribs 34 are provided in the region of the inner wall surface of the air cleaner box 20, the region facing in the vertical direction the fastening surface 32a to which the first plate member 29a is fastened. This structure can increase a stiffness of the wall surface of the air cleaner box 20 on which the gyro sensor 10 is supported. Even when the air-intake pulsation occurs, the vibration of the wall surface of the air cleaner box 20 can be prevented, and the effects of the air-intake pulsation on the gyro sensor 10 can be reduced.

The rear portion of the gyro sensor 10 conforms to the air-intake connection passage P connecting the air cleaner box 20 and the engine E to each other, in a position in the forward and rearward direction. This makes it possible to dispose the gyro sensor 10 in a location that is in the vicinity of the throttle body 14 of the engine E and is the center of gravity in the forward and rearward direction. As a result, the output signal indicating the vehicle body behavior which is close to the vehicle body behavior at the center of gravity G can be obtained.

The distance L1 between the virtual line VL connecting the center axes of the plurality of bolts bolts 28a to each other when viewed from above, and the protruding surface 32b on the second side in the vehicle width direction is shorter than the distance L2 between the virtual line VL and the tip end surface of the connector connection section 10c of the gyro sensor 10. In this configuration, when the connector connection section 10c of the gyro sensor 10 which protrudes to the first side in the vehicle width direction is connected to the ABS controller 15 via the sensor harness 16, an operator can fasten the gyro sensor 10 to the recess 32 of the air cleaner box 20 without making a mistake in a direction of the gyro sensor 10. Thus, the operator can easily fasten the gyro sensor 10 to the recess 32 of the air cleaner box 20 and easily connect it to the ABS controller 15.

Embodiment 2

In a motorcycle according to Embodiment 2, a part of the shape of the air cleaner box 20 of the motorcycle 1 according to Embodiment 1 is changed and the fastening location of the gyro sensor 10 is changed. Hereinafter, regarding an air cleaner box 20A and the fastening location of the gyro sensor 10 according to Embodiment 2, differences from Embodiment 1 will be described.

Figure 6:
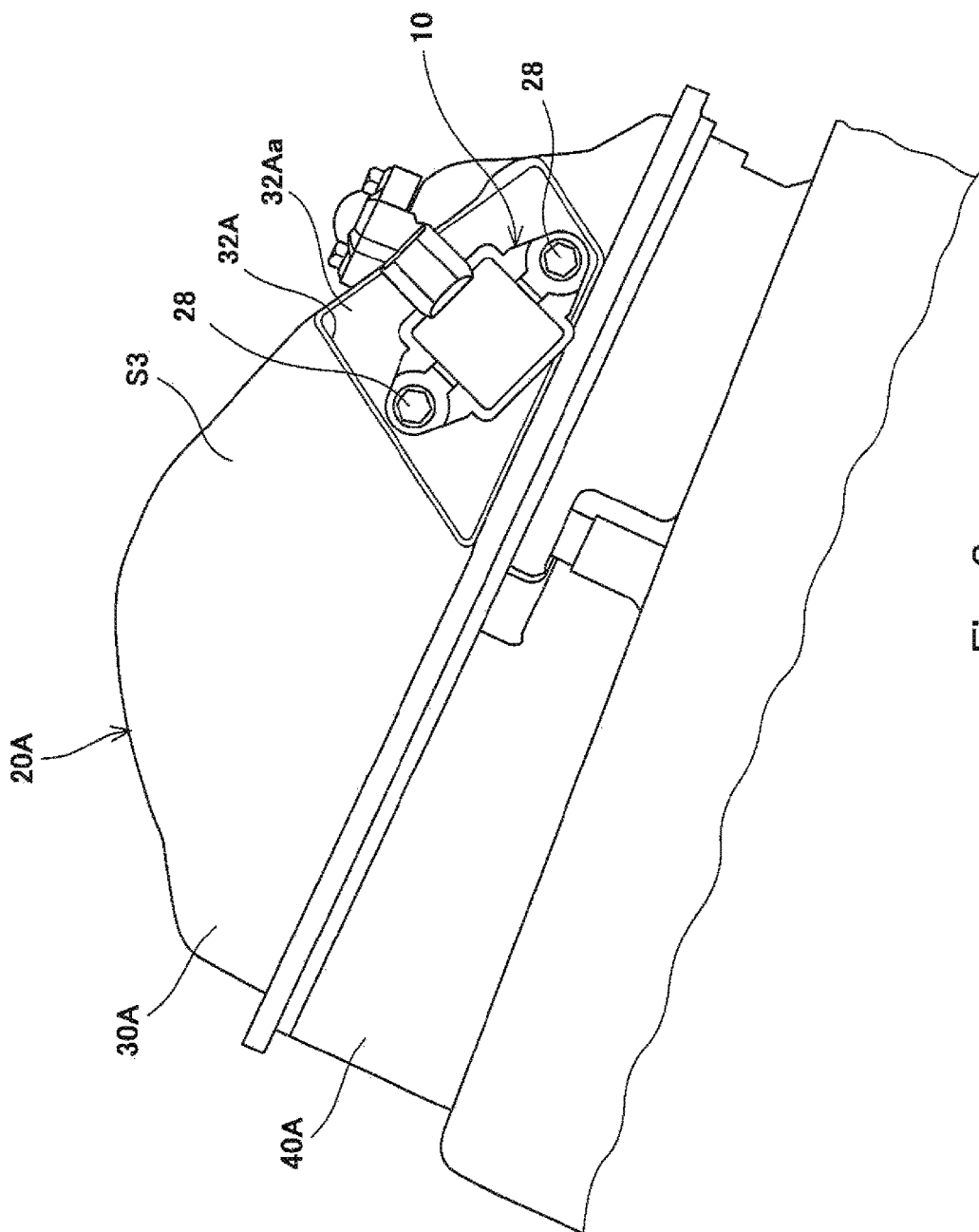
FIG. 6 is a left side view of an air cleaner box mounted in a motorcycle which is an example of a straddle-type vehicle according to Embodiment 2.
Figure 7:
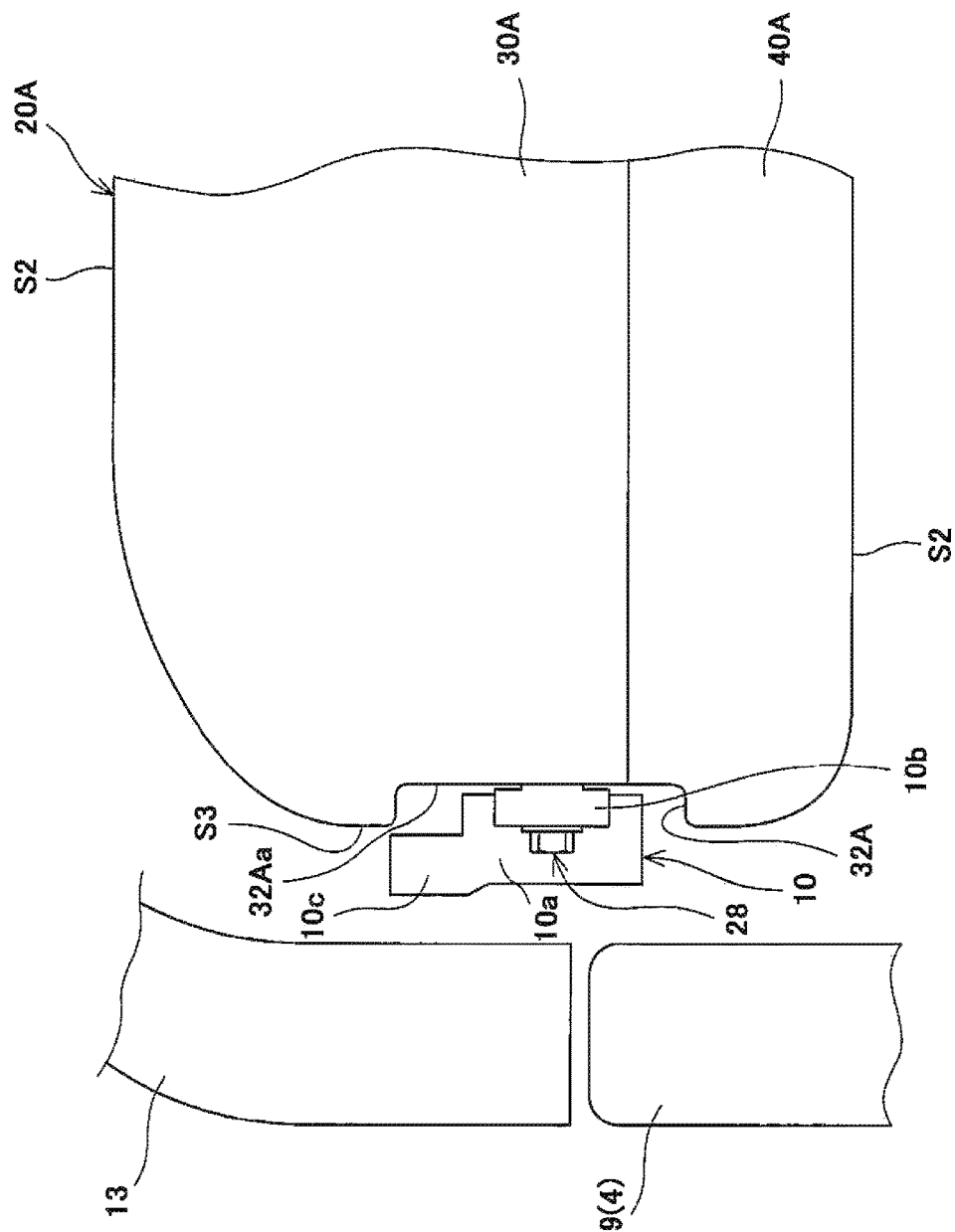
FIG. 7 is a rear view showing a region that is in the vicinity of an air cleaner box according to Embodiment 2.

FIG. 6 is a left side view of the air cleaner box 20A mounted in a motorcycle according to Embodiment 2. FIG. 7 is a rear view showing a region that is in the vicinity of the air cleaner box 20A according to Embodiment 2. As shown in FIGS. 6 and 7, a recess 32A is formed in a left wall surface S3 of an upper case 30A of the air cleaner box 20A to accommodate the gyro sensor 10 therein. The gyro sensor 10 is fastened to an inner surface 32Aa of the recess 32A of the left wall surface S3. The plane area of the left wall surface S3 is smaller than that of the upper wall surface S1. For this reason, even when the air-intake pulsation occurs in the inner space of the air cleaner box 20A, the amplitude of the vibration acting on the left wall surface S3 is less than that acting on the upper wall surface S1.

As shown in FIG. 7, a part of the body section 10a and the flange section 10b of the gyro sensor 10 are disposed in a space defined by the cover member 13, the vehicle body frame 4 (the front frame 9) and the air cleaner box 20A. In a conventional configuration, various harnesses extend in the forward and rearward direction in the space defined by the cover member 13, the front frame 9, and the air cleaner box 20A. The other constituents are the same as those of Embodiment 1.

In accordance with the above-described configuration of Embodiment 2, as in Embodiment 1, the gyro sensor 10 is provided on the periphery (in this example, the left wall surface S3 of the air cleaner box 20A) of the air cleaner box 20A and is located above the bottom wall surface S2 of the air cleaner box 20A. In this layout, since the bottom wall surface S2 of the air cleaner box 20A can suppress the heated air radiated from the engine E from flowing in an upward direction toward the gyro sensor 10, a temperature increase in the gyro sensor 10 can be prevented. Since the gyro sensor 10 is disposed in a location that is in the vicinity of the engine E and close to the center of gravity the gyro sensor 10 can output a signal indicating a vehicle body behavior which deviates less from the vehicle body behavior at the center of gravity G. This makes it possible to provide a sensor layout of the motorcycle 1, which allows the gyro sensor 10 to output the signal indicating the vehicle body behavior which is close to the vehicle body behavior at the center of gravity while thermally protecting the gyro sensor 10.

Since the gyro sensor 10 is fastened to the air cleaner box 20A which is an example of the vehicle component mounted to the vehicle body 11, a sub-unit in which the gyro sensor 10 is fastened to the air cleaner box 20A can be mounted to the vehicle body 11 in the assembling operation of the motorcycle 1. Thus, the assembling operation can be easily carried out.

Since the gyro sensor 10 is fastened to the left wall surface S3 of the air cleaner box 20A, it becomes possible to prevent interference between the gyro sensor 10 and other components and members (e.g., the fuel tank 12) in the vertical direction.

Since the gyro sensor 10 is accommodated in the recess 32A formed in the left wall surface S3, it becomes possible to prevent the gyro sensor 10 from interfering with the cover member 13 and the vehicle body frame 4 (the front frame 9) in the vehicle width direction.

In a case where the air-intake pulsation occurs in the inner space of the air cleaner box 20A, the amplitude of the vibration of the left wall surface S3 is smaller than that of the upper wall surface S1, because the plane area of the left wall surface S3 is smaller than that of the upper wall surface S1. In view of this, by fastening the gyro sensor 10 to the left wall surface S3, the effects of the vibration of the support surface on the gyro sensor 10 can be reduced. In addition, the air cleaner box 20A does not require a reinforcement structure. As a result, the number of members can be reduced.

The gyro sensor 10 is disposed in the space defined by the cover member 13, the front frame 9, and the air cleaner box 20A. Thus, the gyro sensor 10 can be disposed in the space in which the harness and the like are conventionally accommodated. This makes it possible to prevent a reduction of the volume of the fuel tank 12 required to have a larger size and a reduction of the volume of the air cleaner box 20A.

Alternatively, the gyro sensor 10 may be fastened to the right wall surface of the air cleaner box 20A. Further, the gyro sensor 10 may be fastened to the side wall surface of a lower case 40A of the air cleaner box 20A. In this case, when the air cleaner element 41 provided in the inner space of the air cleaner box 20A is replaced, the upper case 30A may be detached in a state in which the gyro sensor 10 is fastened to the lower case 40A. In this way, a displacement of the fastening location of the gyro sensor 10 does not occur when the air cleaner element 41 is replaced. As a result, the accuracy of the signal output from the gyro sensor 10 does not become low.

Embodiment 3

In a motorcycle according to Embodiment 3, the fastening location of the gyro sensor 10 according to Embodiment 1 is changed. Hereinafter, regarding the fastening location of the gyro sensor 10, differences from Embodiment 1 will be described.

Figure 8:
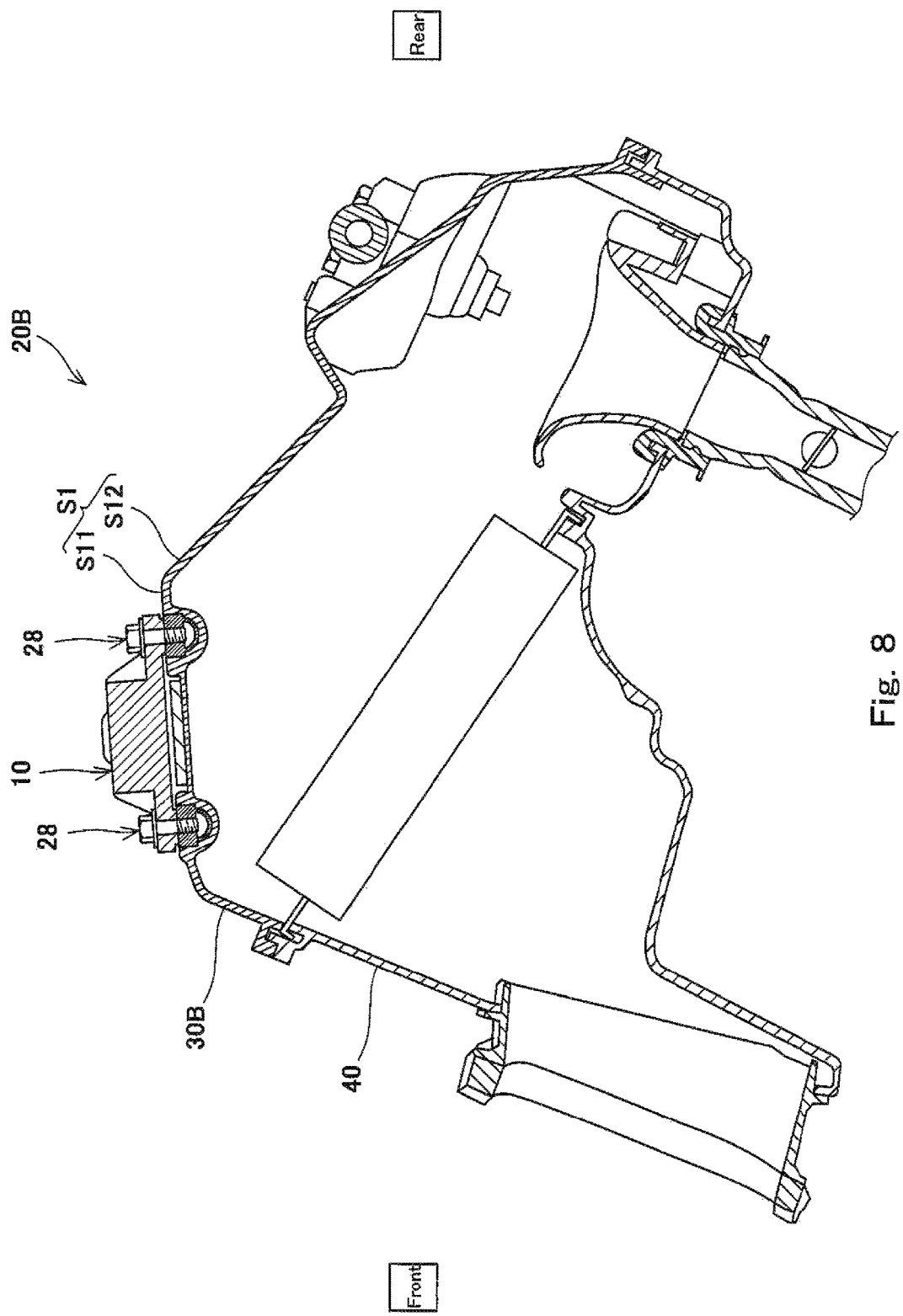
FIG. 8 is a view of an air cleaner box mounted in a motorcycle which is an example of a straddle-type vehicle according to Embodiment 3, corresponding to FIG. 3.

FIG. 8 is a view of an air cleaner box 20B mounted in a motorcycle according to Embodiment 3, corresponding to FIG. 3. As shown in FIG. 8, the gyro sensor 10 is fastened to the first inclined surface portion S11 of an upper case 30B of the air cleaner box 20B. That is, the gyro sensor 10 is fastened to the front portion of the upper wall surface S1 of the air cleaner box 20B. The other constituents are the same as those of Embodiment 1.

In accordance with the above-described configuration of Embodiment 3, as in Embodiment 1, the gyro sensor 10 is provided on the periphery (in this example, the front portion of the upper wall surface S1 of the air cleaner box 20B) and is located above the bottom wall surface S2 of the air cleaner box 20B. In this layout, since the bottom wall surface S2 of the air cleaner box 20B can suppress the heated air radiated from the engine E from flowing in an upward direction toward the gyro sensor 10, a temperature increase in the gyro sensor 10 can be prevented, while disposing the gyro sensor 10 in a location that is in the vicinity of the engine E and close to the center of gravity G.

The gyro sensor 10 is fastened to the air cleaner box 20B which is an example of the vehicle component mounted to the vehicle body 11. Therefore, in the assembling operation of the motorcycle 1, a sub-unit in which the gyro sensor 10 is fastened to the air cleaner box 20B can be mounted to the vehicle body 11. Thus, the assembling operation can be performed more easily.

The gyro sensor 10 is fastened to the first inclined surface portion S11 of the upper wall surface S1 of the air cleaner box 20B, the first inclined surface portion S11 being inclined with respect to the vehicle body center line extending in the forward and rearward direction, and the vertical line extending in the vertical direction. In this configuration, the gyro sensor 10 can detect the angular velocity around the roll axis and the angular velocity around the yawing axis.

The present invention is not limited to the above-described embodiments. The above-described configurations may be changed, added to or deleted from, within a scope of the spirit of the preset invention. Preferably, the vehicle body behavior sensor 10 is disposed above the bottom wall surface of the vehicle component disposed immediately above the engine E. Although in the above-described embodiments, the gyro sensor 10 is disposed above the bottom wall surface S2 of the air cleaner box 20, 20A, 20B, this layout of the gyro sensor 10 is merely exemplary, and the gyro sensor 10 may be disposed above the bottom wall surface of another vehicle component placed above the engine E. For example, other vehicle component such as an evaporator unit which regulates the evaporation amount of the fuel supplied from the fuel tank 12, a fuel pump unit which supplies the fuel from the fuel tank 12 to the engine E, an ECU which controls the operations of devices, a relay box, or a fuse box may be disposed above the engine E, and the vehicle body behavior sensor 10 may be disposed above the bottom wall surface of such a vehicle component.

Further, the vehicle body behavior sensor 10 may be fastened to the vehicle component disposed above the air cleaner box 20, 20A, 20B, such as the fuel tank 12 or the fuel pipe. Thus, a case where the vehicle component which can prevent the heated air radiated from the engine E from flowing toward the vehicle body behavior sensor 10 is different from the vehicle component to which the vehicle body behavior sensor 10 is fastened is also included in the present invention. In this case, the vehicle component to which the vehicle body behavior sensor 10 is fastened has a function of allowing the motorcycle 1 to travel as well as a function of fastening the vehicle body behavior sensor 10 thereto. In this configuration, the number of members can be reduced, compared to the configuration in which a member used for exclusively fastening the vehicle body behavior sensor 10 is additionally provided. In order to prevent a situation in which a vibration of the engine E or a vibration of the vehicle body frame 4 generated while the motorcycle 1 is traveling on an uneven road surface is transmitted to the vehicle body behavior sensor 10, the vehicle component to which the vehicle body behavior sensor 10 is fastened is preferably made of the resin material. The vehicle body behavior sensor 10 may be fastened to the vehicle component via a vibration absorbing member.

Although in the above-described embodiments, the gyro sensor 10 is fastened to the outer wall surface of the air cleaner box 20 by use of the fastener members 28 (the bolts 28*a* and the nuts 28*b*), this configuration is merely exemplary. For example, the gyro sensor 10 may be fastened to a metal bracket by use of fastener members (e.g., bolts and nuts), and then the bracket may be fastened to the outer wall surface of the air cleaner box 20, 20A, 20B via an elastic member. Although in Embodiment 1, the gyro sensor 10 is fastened to the second inclined surface portion S12 of the upper wall surface S1 of the air cleaner box 20, and is configured to detect the angular velocity around the roll axis and the angular velocity around the yawing axis, this configuration is merely exemplary. The gyro sensor 10 may be a sensor which detects the angular velocity around any one of the roll axis, the yawing axis, and a pitching (pitch) axis, or a sensor which detects the angular velocities around all of the roll axis, the yawing axis, and the pitching axis. Further, the vehicle body behavior sensor 10 is not limited to the gyro sensor, and may be, for example, an acceleration sensor which detects an acceleration rate of the motorcycle 1 in any one of the forward and rearward direction, the vertical direction, and the rightward and leftward direction.

Although in the above-described embodiments, the vehicle body behavior sensor 10 is used to control the ABS and the output of the engine E, it may be used to control another actuator mounted to the vehicle body 11. For example, a lighting control for turning on an auxiliary pump in a direction in which the motorcycle 1 turns may be performed based on the signal output from the vehicle body behavior sensor 10. Further, the signal output from the vehicle body behavior sensor 10 may be stored, and the rider may check the vehicle body behavior after traveling of the motorcycle 1. The vehicle body behavior may be utilized to allow the rider to perform a driving operation properly. Although in the above-described embodiments, the plate members 29*a* to 29*c* are fastened to the outer wall surface of the air cleaner box 20, 20A, 20B, on which the gyro sensor 10 is supported, to provide the reinforcement structure 29, this configuration is merely exemplary. For example, the outer wall surface of the air cleaner box 20, 20A, 20B may be provided with ribs to increase the stiffness of the air cleaner box 20, 20A, 20B. Moreover, the straddle-type vehicle is not limited to the motorcycle 1 and may be, for example, an all-terrain vehicle (ATV), or the like.

The invention claimed is:

1. A straddle-type vehicle comprising:
   a front wheel and a rear wheel;
   an engine disposed between the front wheel and the rear wheel;
   a fuel tank;
   an air cleaner box disposed above the engine; and
   a vehicle body behavior sensor provided on a periphery of the air cleaner box and located above a bottom wall surface of the air cleaner box,
   wherein when viewed from above, the vehicle body behavior sensor is disposed in such a manner that the vehicle body behavior sensor is hidden by the fuel tank.

2. The straddle-type vehicle according to claim 1, wherein at least a portion of the air cleaner box is disposed on a straight line connecting the vehicle body behavior sensor and the engine to each other.

3. The straddle-type vehicle according to claim 1, wherein the vehicle body behavior sensor is attached and supported on the air cleaner box.

4. The straddle-type vehicle according to claim 3, wherein the air cleaner box includes a reinforcement structure which suppresses a vibration in a thickness direction of a support surface on which the vehicle body behavior sensor is supported.

5. The straddle-type vehicle according to claim 4, wherein the reinforcement structure includes a plurality of plate members.

6. The straddle-type vehicle according to claim 1, wherein the vehicle body behavior sensor is disposed on a side wall surface of the air cleaner box.

7. The straddle-type vehicle according to claim 1, wherein at least a part of the vehicle body behavior sensor conforms to an air-intake connection passage connecting the air cleaner box and the engine to each other, in a position in a forward and rearward direction.

8. A straddle-type vehicle comprising:
   a front wheel and a rear wheel;
   an engine disposed between the front wheel and the rear wheel;
   a vehicle component disposed above the engine; and
   a vehicle body behavior sensor disposed above a bottom wall surface of the vehicle component, and attached on the vehicle component,
   wherein a fuel supply pipe is fastened to the vehicle component by a fastening member.

9. The straddle-type vehicle according to claim 8, further comprising:
   an injector provided at the vehicle component,
   wherein the fuel supply pipe is connected to a fuel tank and supplies fuel to the injector.

10. A straddle-type vehicle comprising:
    a front wheel and a rear wheel;
    an engine disposed between the front wheel and the rear wheel;
    an air cleaner box disposed above the engine; and
    a vehicle body behavior sensor provided on a periphery of the air cleaner box and located above a bottom wall surface of the air cleaner box,
    wherein the vehicle body behavior sensor is attached and supported on the air cleaner box, and
    wherein the air cleaner box has on an outer wall surface thereof, a recess in which at least a portion of the vehicle body behavior sensor is accommodated.

11. The straddle-type vehicle according to claim 10, wherein the recess of the air cleaner box includes a fastening surface to which the vehicle body behavior sensor is fastened, and protruding surfaces protruding upward from both ends of the fastening surface in a vehicle width direction, and
    wherein an inner space of the recess opens forward along the fastening surface.

12. The straddle-type vehicle according to claim 4, wherein the air cleaner box is formed of a resin material, and
    wherein the reinforcement structure is constituted by a plate member for increasing stiffness of a wall surface of the air cleaner box.

13. The straddle-type vehicle according to claim 1, wherein the fuel tank is disposed above the air cleaner box, and
    wherein the vehicle body behavior sensor is disposed between the fuel tank and the air cleaner box.

* * * * *